(12) United States Patent
Barber et al.

(10) Patent No.: US 7,209,648 B2
(45) Date of Patent: Apr. 24, 2007

(54) MULTIMEDIA RECORDING SYSTEM AND METHOD

(76) Inventors: Jeff Barber, 11301 30th Cove East, Parrish, FL (US) 34219; Terry Zipprer, 2117 Dunbarton Way, Lakeland, FL (US) 33813; Phil White, 137 Pinellas St., Lakeland, FL (US) 33803

( * ) Notice: Subject to any disclaimer, the term of this patent is extended or adjusted under 35 U.S.C. 154(b) by 1100 days.

(21) Appl. No.: 10/160,578

(22) Filed: Jun. 1, 2002

(65) Prior Publication Data

US 2003/0165319 A1    Sep. 4, 2003

Related U.S. Application Data

(60) Provisional application No. 60/361,471, filed on Mar. 4, 2002.

(51) Int. Cl.
*H04N 5/00*   (2006.01)
(52) U.S. Cl. .................... 386/117; 386/95; 386/118; 725/12

(58) Field of Classification Search ............... 386/4, 386/46, 52, 56, 64, 69, 70, 81–83, 95; 360/5, 360/13, 14.1, 14.2, 14.3, 18; 348/333.06, 348/333.07
See application file for complete search history.

(56) References Cited

U.S. PATENT DOCUMENTS 5,896,164 A * 4/1999 Orbach et al. ............... 725/12
5,956,458 A * 9/1999 Sezan et al. ................. 386/95

\* cited by examiner

*Primary Examiner*—Thai Q. Tran
*Assistant Examiner*—Mishawn Dunn
(74) *Attorney, Agent, or Firm*—Matthew G. McKinney

(57) ABSTRACT

The present invention is a novel fully interactive multimedia recording system that organizes and catalogues different multimedia data easily and expeditiously using uniform arrays of data packets, thereby achieving improved efficiency of transfer to a memory and storage means over prior art. The data packets may be time variable thus each array is also time variable at the discretion of the user. The effect is to reduce the time of synchronizing the different memory and storage mediums for transfer by providing temporal and uniform data arrays.

15 Claims, 7 Drawing Sheets

(a) INPUT DATA

| PACKET | 1 | 2 | 3 | 4 | 5 | 6 | 7 | 8 | 9 | 10 |
|---|---|---|---|---|---|---|---|---|---|---|
| AUDIO | | | ■ | | | | | ■ | | |
| STREAMING VIDEO | | | ■ | | | | | | | |
| SINGLE FRAME VIDEO | | | | | ■ | | | ■ | | |
| BIOFEEDBACK | | | ■ | | | | | | | |

TIME →

5

(b) OPERATION OF RECORDING TO INTERMEDIATE STORAGE MEDIUM

TIME →

| PACKET ARRAY | 1 | | |
|---|---|---|---|
| PACKET | 3 | 5 | 8 |
| AUDIO | ■ | | ■ |
| STREAMING VIDEO | ■ | | |
| SINGLE FRAME VIDEO | | ■ | ■ |
| BIOFEEDBACK | ■ | | |

MULTIMEDIA RECORDING SYSTEM AND METHOD

CROSS-REFERENCED TO RELATED APPLICATIONS

This application claims the benefit of U.S. Provisional Application No. 60/361,471 filed Mar. 4, 2002. The disclosure of the provisional application is incorporated herein by reference.

BACKGROUND OF THE INVENTION

1. Field of the Invention

This invention relates, generally, to recording systems and more particularly to providing a fully interactive multimedia recording system and a method for cataloging multimedia data for transfer to storage, computer systems and between multimedia devices.

2. Description of the Prior Art

There presently exist many types of audio and video recording systems. The most common being magnetic tape systems with digital recording systems becoming more popular. The magnetic tape or digital media systems capture images via a camera and record the corresponding audio using a microphone. However, stand-alone audio devices are not easily compatible with video devices because of the different recording techniques of the respective devices. Furthermore, editing of separate video or audio recordings requires interconnecting the recording devices separately to a central editing machine.

Continuing efforts are being made to improve the transfer of data between multimedia recording devices and computer systems. By way of example, infrared light waves have been used as a method of transmitting the multimedia data between a device and computer system. Digital still cameras and digital video cameras allow images to be stored without the use of traditional film products or magnetic tape. However, synchronizing the recording devices for transferring the data to a computer system can be difficult for an amateur user and time consuming. Furthermore, the prior art does not catalogue or organize the data after being downloaded to a computer system, but the data is simply stored and not in chronological order.

There exists a need to allow a user to organize and catalogue different multimedia data easily and expeditiously during transfer to a computer system. In summary, the needed improvements include reducing the time to synchronize the different multimedia data for downloading and allowing different types of multimedia data to be recorded in sequential fashion. Additionally, a product that incorporates all of the above features and allows collaboration using the Internet, intranet, or similar communicative means is also needed.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a multimedia recording system and method that records different types of multimedia data and catalogues the data efficiently is now provided in the form of a new, useful and non-obvious system.

The present invention comprises a multimedia recording system for sequentially recording video data and audio data and cataloging the data, a primary memory means within a multimedia device for temporarily storing video and audio data captured by the multimedia device, a recording control means within the multimedia device for controlling reading and writing of desired digital video and audio data from the primary memory means to a primary recording medium, a packet of digital data formed by a segment of continuous writing of the desired video and audio data to the primary recording medium, the recording control means being adapted to repeat the reading and writing of the desired digital video and audio data from the primary memory means thereby forming a sequential array of packets on the primary recording medium wherein the array contains at least one packet, a base providing a docking interface wherein the docking interface transmits or receives the sequential array of packets with the multimedia device in response to the multimedia device being in contact with the docking interface, and a playback module wherein the playback module provides a playback signal preselected from the array of packets. The packet arrays and playback signal can include recorded biofeedback signals that temporally correspond to video and audio data so that the recorded biofeedback signal is present during playback of the array of packets.

The base can include a primary storage medium such as a rewritable CD, hard drive, or other similar storage medium well known in the art for the reading and recording of the array of packets. The multimedia device is capable of providing a packet containing multi-frame video data including corresponding audio. Further, the multimedia device is capable of providing a packet containing single-frame video data including corresponding audio. Alternatively, the multimedia device is capable of providing a packet solely of audio data. The multimedia data can be recorded in sequential fashion without regard to whether the data is a picture, a movie or simply an audio recording.

The base of the system includes a cataloging module, wherein the cataloging module assists the array of packets upon receiving into predetermined chronological units of data for recording on the primary storage medium. The base unit is also provided with a projection feature that allows the stored video data to be projected and previewed.

The multimedia system can interface with a target computer with a secondary storage medium such as a CD, hard drive, or other similar mediums well known in the art for receiving, storing or transmitting the array of packets. The target computer can include a cataloging module to assist the array of packets upon receiving into a predetermined chronological units of data for recording on the secondary storage medium. When the docking interfaces are placed in contact with each other, the multimedia data packet arrays are transferred between the target computer and the multimedia device with the touch of a button. The docking feature allows the multimedia system to interface with the target computer when the computer is powered on, and, in response, data is electronically transferred.

The multimedia data packet arrays being transferred to the base or target computer are automatically and chronologically correlated and stored in digital folders on the secondary medium with the outside of the digital folder depicting a single video frame from the stored data. This allows a user to identify the contents of a digital folder. The digital folders can easily be transferred back to the multimedia device for transport and/or transfer to a second target computer.

An important object of the present invention is to provide a device that allows different multimedia to be recorded.

Another object of the present invention is to provide a method that catalogues and organizes the multimedia data.

Still another object of the present invention is to provide a device that can download and upload multimedia data for storage and transfer of the data.

Yet another object of the present invention is to provide a device that is compact and lightweight.

Another object of the present invention is to record sequential events of an individual's lifetime to provide a personal and insightful digital diary.

Still another object of the present invention is to provide expandable long-term storage of the digital diary.

These and other important objects, advantages, and features of the invention will become clear as this description proceeds.

It is to be understood that both the foregoing general description and the following detailed description are explanatory and are not restrictive of the invention. The accompanying drawings, which are incorporated in and constitute part of the specification, illustrate embodiments of the present invention and together with the general description, serve to explain principles of the present invention.

The invention accordingly comprises the features of construction, combination of elements, and arrangement of parts that will be exemplified in the description set forth hereinafter.

BRIEF DESCRIPTION OF THE DRAWINGS

For a fuller understanding of the nature and objects of the invention, reference should be made to the following detailed description, taken in connection with the accompanying drawings, in which:

FIG. 8 is a chart showing the operations of the recording control means.

DETAILED DESCRIPTION OF THE PREFERRED EMBODIMENT

Figure 1:
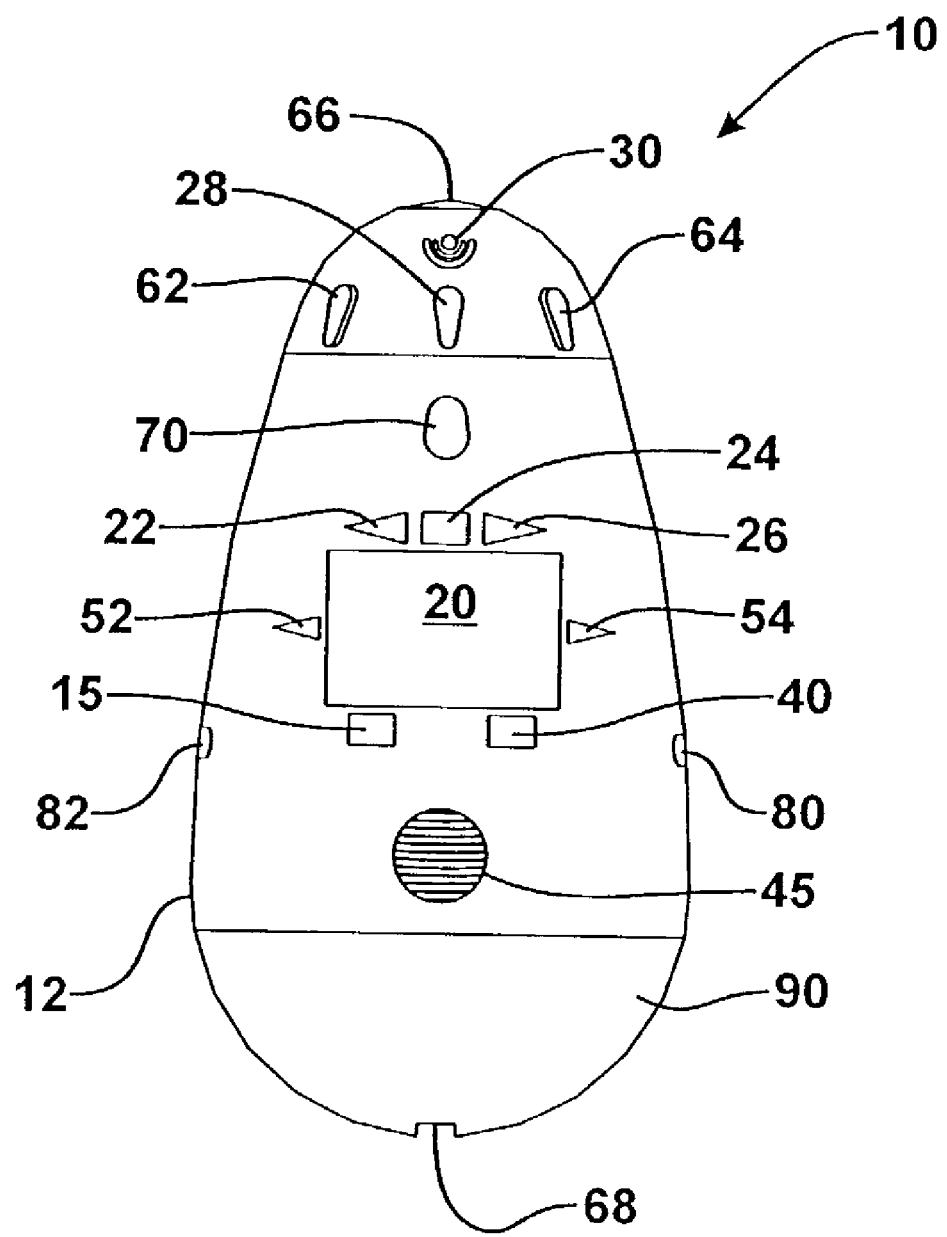
FIG. 1 is a front view of a multimedia device in accordance with the present invention.
Figure 2:
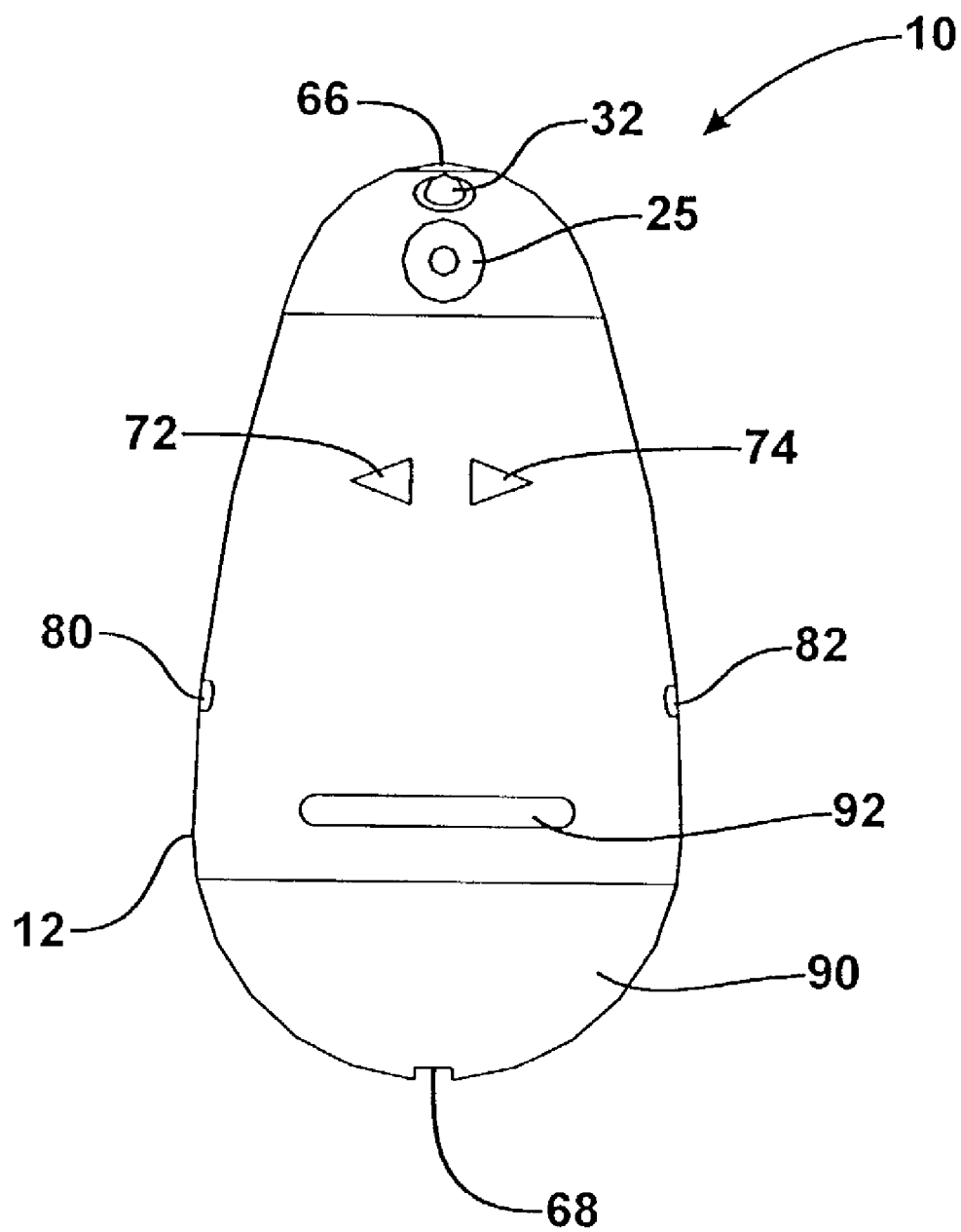
FIG. 2 is a rear view of a multimedia device in accordance with the present invention.
Figure 3:
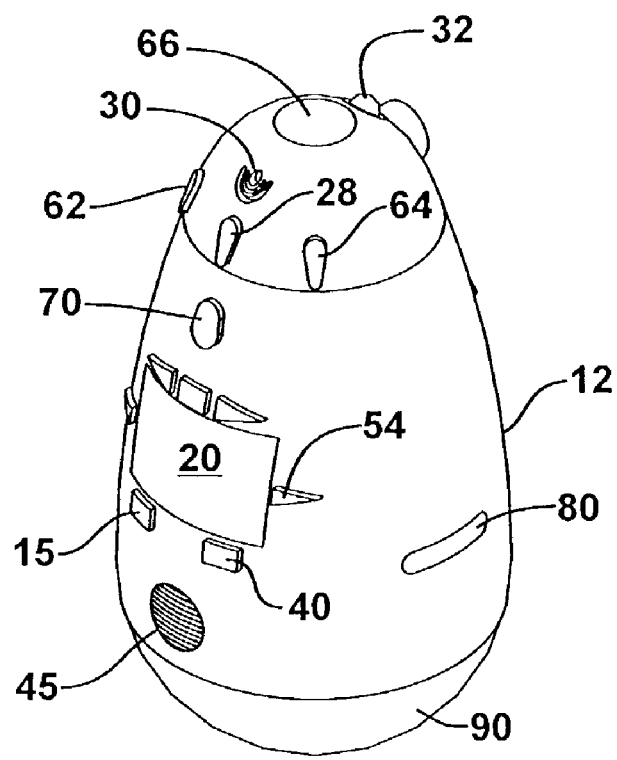
FIG. 3 is a top perspective view of a multimedia device in accordance with the present invention.
Figure 4:
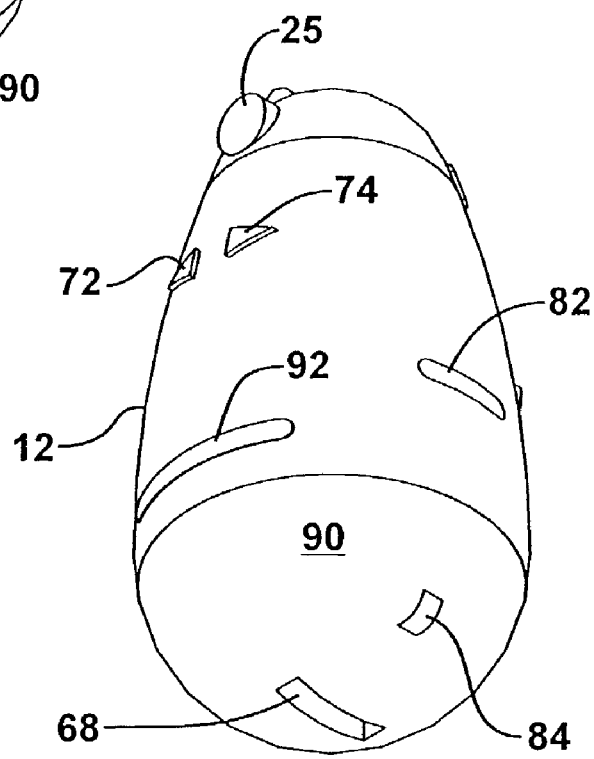
FIG. 4 is a bottom perspective view of a multimedia device in accordance with the present invention.

Referring now to FIGS. 1 and 2, it will be seen that the reference numeral denotes the multimedia device as a whole. Device 10 includes a housing 12 that protects the internal circuitry that is turned on using power button 15. The user initiates the recording control means of the multimedia data by pressing one of the record buttons 22, 24, and 26. Single frame (still picture) image button 22 activates the recording of one video image packet via self-focusing camera lens 25 shown in FIG. 2. The still pictures can be of various resolutions. Flash button 28 when activated provides additional light using flash 32 shown in FIG. 2 for enhanced contrast for recording still pictures and video stream packets (movies). Video button 26 activates the recording control means for the recording of a movie as multimedia data packet for playback and transfer to a target computer (not shown) or base. Still pictures and movies have various modes of being recorded such as classic, black and white or sepia. Audio button 24 activates the recording control means to record audio only packets via microphone 30. Still pictures and movies have the option of being recorded with corresponding audio. As can be appreciated, there is no specific requirement as to the location of any of the buttons of multimedia device 10.

The video playback module controls the playback from the intermediate storage medium of recorded video packets on liquid crystal display 20 when activated using start button 40. Button 40 is also used to stop the video playback. Rewind button 52 and fast forward button 54 are provided to allow a user to locate and review specific video packets of recorded multimedia data stored in the primary recording medium or alternatively on the secondary recording medium. Speaker 45 is provided for listening to audio corresponding to the recorded video data and stand-alone recorded audio data packets.

A voice activation button 62 is provided so that the recording control means of device 10 is activated to record data when a previously designated voice is recognized. The features of device 10 can be viewed and selected on display 20 and scrolled through using menu button 64.

Multimedia data packets recorded by device 10 can be transmitted using a first docking interface comprising an infrared port 66 or USB port 68. The transmission is commenced by transfer button 70. In the alternative, data can also be received by device 10. Infrared port 66 allows the wireless transfer of data between a target computer or another device 10 or other compatible multimedia recording device.

Self-record buttons 72 and 74 can be activated for recording a self-image or self-video stream packet, respectively. Biofeedback sensors 80 and 82 are provided so that a user can either listen to and monitor their pulse or can attempt to manipulate the piezoelectric resistance of their skin relative to their present state of rest or stress. In the preferred embodiment, the pulse or other biofeedback of a user can be broadcast over speaker 45 and the color of screen 20 changes color in response to the biofeedback. Additionally, the recording control means of device 10 can record biofeedback signals that temporally correspond to video and audio data.

A pair of battery contacts 84 is provided on the lower end of device 10 for recharge purposes. Battery pack 90 provides the current to power device 10. Battery 10 in the preferred embodiment is a removable lithium ion battery. However, as can be appreciated, the energy source identified in the preferred embodiment is based on current state of the art technology and can be substituted, without limitation, with any future compatible energy source. A serial number is stamped on a plate 92 and placed on housing 12 for identification of each individual's multimedia device 10.

Figure 5:
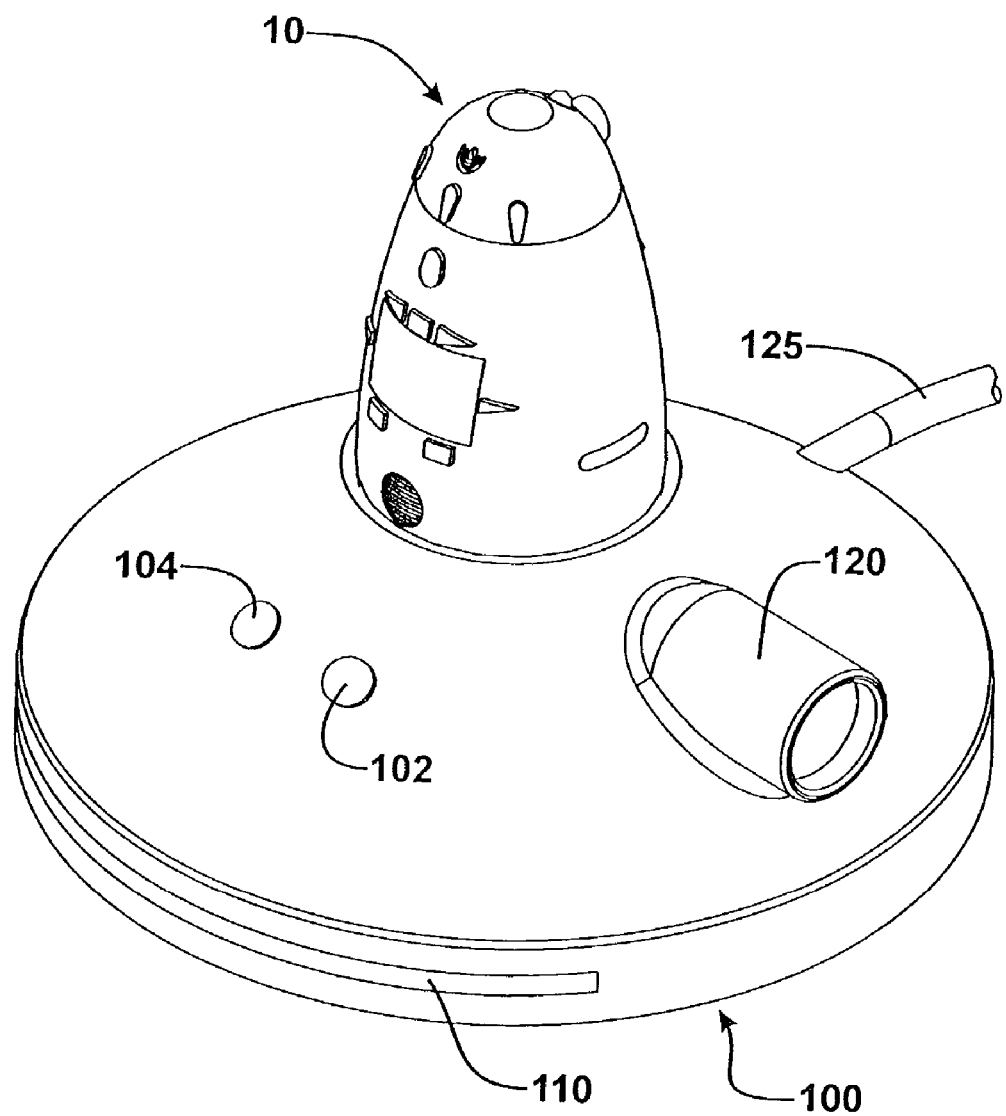
FIG. 5 is a perspective view of a multimedia system in accordance with the present invention showing a multimedia device docked with a receiving port of a base unit.
Figure 6:
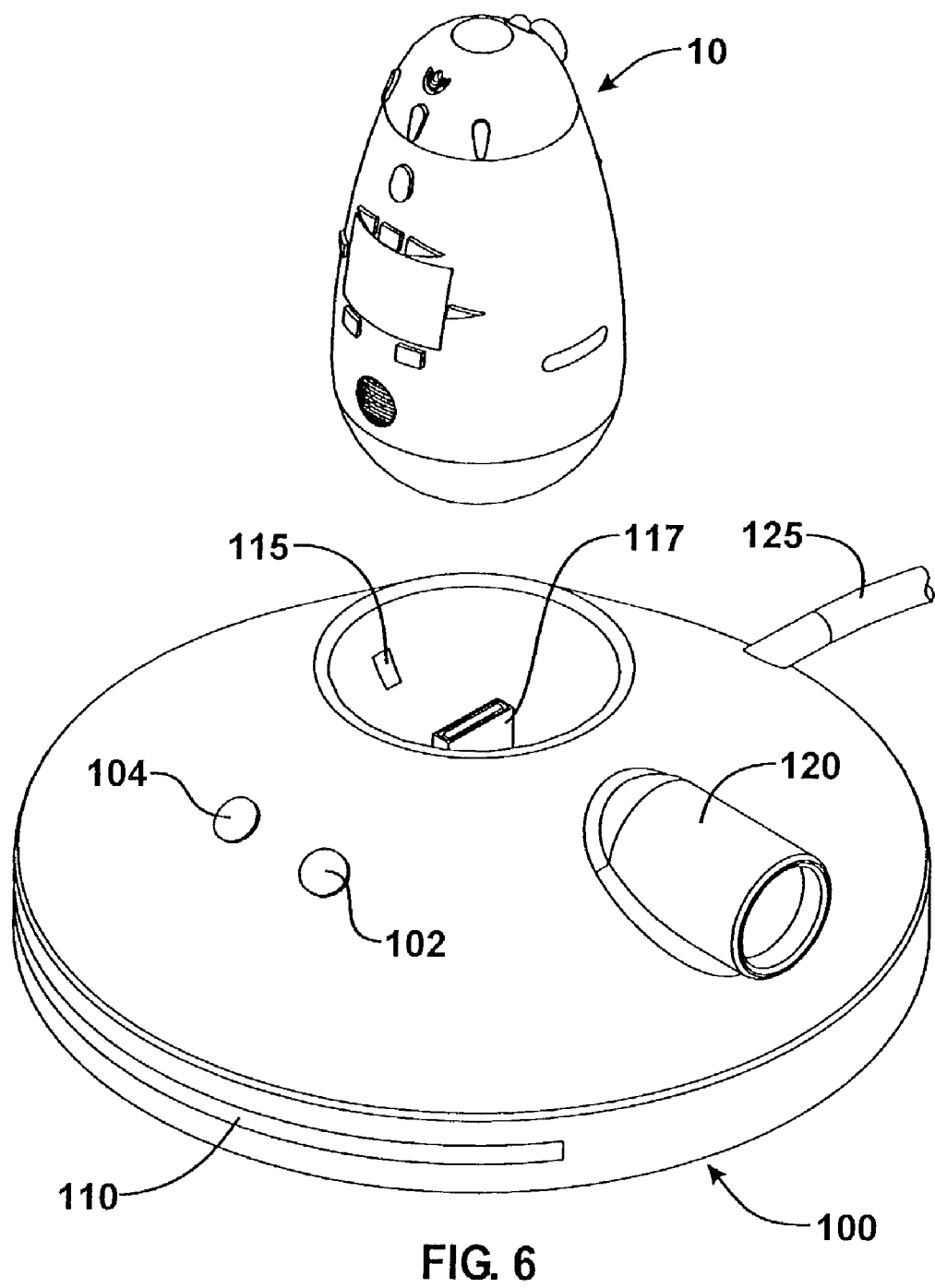
FIG. 6 is a perspective view showing the docking features of the base unit.

Referring now to FIGS. 5 and 6, once the desired multimedia data packets have been recorded and stored by device 10 on the intermediate storage medium, the packets forming an array can then be downloaded to a target computer or to base unit 100. Device 10 is docked with base unit 100 using a second docking interface to recharge battery pack 90 via a pair of recharge contacts 115 and to download data via USB port 117 to a target computer if desired. Base unit buttons 102 and 104 control the downloading and uploading of data packet arrays to device 10. A CD/DVD slot 110 is located on base unit 100 to record data directly to a CD or DVD from device 10. USB and power wire 125 connects base unit 100 and a target computer (not shown) for transfer of data. Base unit 100 also incorporates a projection module 120 that allows recorded video data to be displayed directly from unit 100. Primary storage medium in the form of a hard drive or other similar storage medium well known in the art is also incorporated within base unit 100 for storing data. The primary storage is capable of storing a lifetime of events within. The primary storage is comprised of at least one storage module that is capable of being interconnected and stacked upon another storage module to provide an expansion capability of the primary storage. Furthermore, the multimedia recording device is capable of operating independent of a target computer. Base unit 100 can be connected directly to a television or VCR for playback of multimedia data. When device 10 is not docked with base unit 100, a spare battery can be charged.

Device 10 is provided with system control indicators (not shown) that inform the user of low battery life, low memory storage and other similar status. USB hard drive sticks or other similar storage medium well known in the art to record digital signals is used to provide additional intermediate storage medium for device 10.

Figure 7:
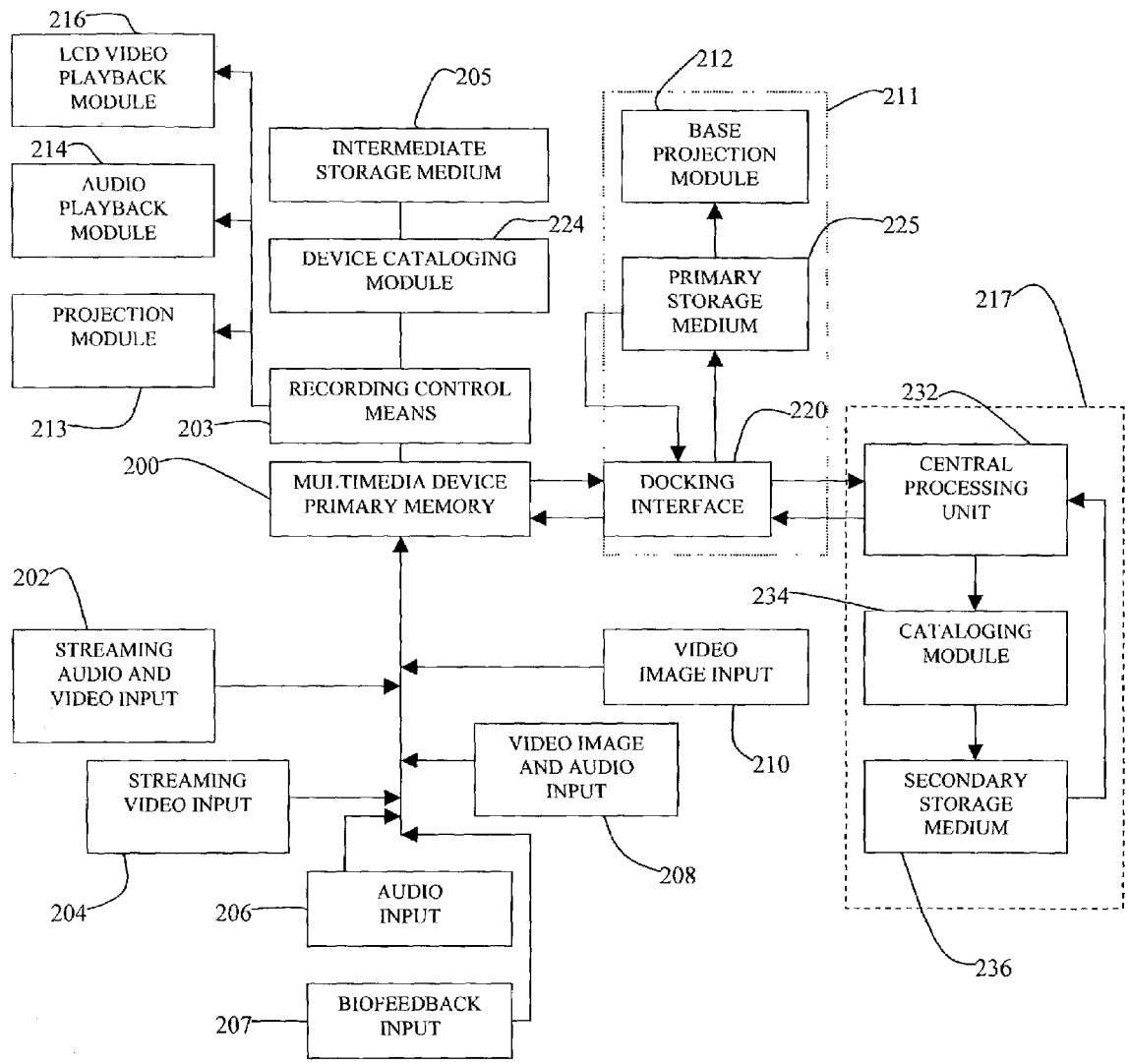
FIG. 7 is a block diagram of a system in accordance with the present invention.

FIG. 7 illustrates a block diagram of one embodiment of the present invention, wherein various input devices of device 10 provide data for recording. The data can be streaming audio and video input 202, streaming video input 204, audio input 206, biofeedback input 207, video image and audio input 208 and video image input 210. The input is captured by a primary memory means 200 and then recording module 203 writes the input data into packets forming a packet array for storage on intermediate storage medium 205 within device 10. Once stored the video data packets can be viewed using the base projection module 120 located on base unit 100 shown in FIGS. 5 and 6 and denoted 212 on FIG. 7. Additionally, device 10 is provided with a LCD playback module 213 so that video data can be viewed instantaneously using screen 20 located on device 10. An audio playback module 214 allows stored audio data packets to be played back from device 10 via speaker 45. Transmitting and receiving data packets is accomplished through a docking interface 220 of base 211. Docking interface 220 provides a means for stored data on the intermediate storage medium 205 to be transferred directly to a CD or DVD (not shown) in a chronological and sequential fashion. The different types of data are maintained in chronological order within a packet array using device cataloging module 224 allowing video (with or without audio), still pictures (with or without audio), and separate audio to be stored sequentially without regard to the different types of data packets. Alternatively, stored data can be transferred to a target computer designated generally as 213. Computer 213 is provided with a cataloging module 234 that organizes the data packet arrays chronologically. Cataloging module 234 creates folders in conjunction with CPU 232 to display a single frame video image that identify the typical contents of the corresponding folder. This allows a user to quickly find desired audio or video data without opening each digital folder. The digital folders are stored on secondary storage medium 236 for target computer 213 and primary storage medium 225 for base 211.

With reference to FIG. 8(*a*), a series of input signals that include different combinations of input data such as Packet 3 with audio, video and biofeedback input, are divided into packets, these packets are written to the primary memory of device 10. The packets are then formed into a sequential packet array as shown in FIG. 8(*b*). The packet array is stored on the intermediate storage medium such as magnetic tape, USB hard sticks, or other storage medium well known in the art until transfer to a primary storage medium. The number of packets per each array is determined by the user and corresponds to an event in time. For example, Packet Array 1 could include several packets from a child's football game and Packet Array 2 (not shown) could include packets from a relative's wedding ceremony. Each packet array is cataloged and stored in a respective digital folder corresponding chronologically to that particular event. FIG. 8 shows packet 3 includes streaming video with corresponding audio and biofeedback signals, packet 5 includes a single frame video, and packet 8 includes a single frame video with corresponding audio. Packets 3, 5, and 8 are first written to the primary memory means of the multimedia device and then recorded and stored on the intermediate storage medium as a packet array. The packet array is cataloged upon transfer to a primary storage medium. The unrecorded packets are discarded from the primary memory means. Each packet is time variable and thus each array is also time variable at the discretion of the user.

Now that the invention has been described,

What is claimed is:

1. A multimedia recording system for sequentially recording video and audio data, comprising:

a multimedia recording device having an ergonomically elliptical shape that is tapered towards a top portion of said multimedia device so that said multimedia device is easily grasped by a hand of a user;

a rectangular USB docking slot disposed on a removable bottom portion of said multimedia device so that recorded data stored in an intermediate storage medium of said multimedia recording device can be transmitted directly and efficiently between a base unit using said docking slot;

said removable bottom portion of said multimedia recording device having an internal chamber for storing a removable battery wherein said external surface of said multimedia recording device further comprises a pair of external battery contacts in electrical communication with said removable battery so that said battery is recharged without removing from said internal chamber;

an infrared port disposed at an apex of said multimedia recording device so that wireless transfer of recorded data stored in intermediate storage medium of said multimedia recording device can be transmitted between a target computer or other similar device;

an arcuate liquid crystal display disposed on a front surface of said multimedia recording device so that recorded video data can be viewed by said user;

an audio speaker disposed adjacent to said liquid crystal display so that recorded audio data can be heard simultaneously with viewing said recorded video data;

a self-focusing camera disposed on an opposing surface from said arcuate liquid crystal display so that images can be captured and digitally recorded within said multimedia recording device;

a pair of biofeedback sensors disposed on opposing surfaces of said multimedia recording device and adapted to be grasped between fingers of said hand of said user so that said user can monitor a corresponding pulse rate visually through said liquid crystal display and audibly through said speaker;

a primary memory means within said multimedia device for temporarily storing video and audio data captured by said multimedia device;

a recording control means within said multimedia device for controlling reading and writing of desired digital video and audio data from said primary memory means to an intermediate storage medium;

said recording control means further controlling the reading and writing of corresponding biofeedback signals to said intermediate storage medium;

a packet of digital data formed by a segment of continuous writing of said desired video and audio data to said intermediate storage medium within said multimedia recording device;

said recording control means being adapted to repeat said reading and writing of said desired digital video and audio data from said primary memory means thereby forming a sequential array of packets on said intermediate storage medium wherein said array contains at least one packet containing multi-frame video data and corresponding audio;

a playback module wherein said playback module provides a playback signal preselected from said array of packets;

said base unit having a dome shape with a flat bottom surface and further comprising a concave depression adapted to receive said bottom portion of said multimedia device;

said concave depression having an USB rectangular projection adapted to be inserted into the USB slot of said multimedia recording device so that recorded data is transmitted between said multimedia recording device and said base unit when said multimedia recording device is placed in said base unit by said user;

said concave depression having a pair of electrical recharge contacts adapted to be in electrical communication with said battery contacts of said multimedia recording device so that said battery is recharged when said multimedia recording device is placed in said base unit by said user; and a projection lens disposed on said base unit so that video data received from said multimedia device is projected for viewing by said user.

2. The primary memory means of claim 1 further recording biofeedback signals captured by said multimedia device wherein said biofeedback signals temporally correspond to video and audio data.

3. The packets of claim 1 further comprising corresponding biofeedback signals.

4. The base of claim 1 further comprising a rewritable primary storage medium for the reading and recording of said array of packets.

5. The multimedia device of claim 1, wherein said packet contains single-frame video data.

6. The multimedia device of claim 1, wherein said multimedia device is capable of providing a packet of audio data.

7. The multimedia device of claim 1 further comprising a cataloging module, wherein said cataloging module assists said array of packets upon receiving into predetermined chronological units of data for recording on a primary storage medium.

8. The multimedia system of claim 1 further comprising a target computer with a secondary storage medium wherein said base is in electrical communication with said target computer for receiving, storing or transmitting said array of packets, on said secondary storage medium.

9. The multimedia system of claim 7 further comprising a target computer with a secondary storage medium wherein said base is in electrical communication with said target computer for receiving, storing or transmitting said predetermined chronological units of data with said secondary storage medium.

10. The base of claim 7 further comprising a primary storage medium.

11. The playback module of claim 3 wherein said playback signal includes said recorded biofeedback signals temporally corresponding to video and audio data so that said recorded biofeedback signal is present during playback of said array of packets.

12. A method for sequentially recording video and audio data, comprising:

providing a multimedia recording device having an ergonomically elliptical shape that is tapered towards a top portion of said multimedia device so that said multimedia device is easily grasped by a hand of a user;

providing a rectangular USB docking slot disposed on a removable bottom portion of said multimedia device so that recorded data stored in an intermediate storage medium of said multimedia recording device can be transmitted directly and efficiently between a dome shaped base unit using said docking slot; wherein said removable bottom portion of said multimedia recording device having an internal chamber for storing a removable battery and said external surface of said multimedia recording device further providing a pair of external battery contacts in electrical communication with said removable batten so that said battery is recharged without removing from said internal chamber;

providing an infrared port disposed at an apex of said multimedia recording device so that wireless transfer of recorded data stored in intermediate storage medium of said multimedia recording device can be transmitted between a target computer or other similar device;

providing an arcuate liquid crystal display disposed on a front surface of said multimedia recording device so that recorded video data can be viewed by said user;

providing an audio speaker disposed adjacent to said liquid crystal display so that recorded audio data can be heard simultaneously with viewing said recorded video data;

providing a self-focusing camera disposed on an opposing surface from said arcuate liquid crystal display so that images can be captured and digitally recorded within said multimedia recording device;

providing a pair of biofeedback sensors disposed on opposing surfaces of said multimedia recording device and adapted to be grasped between said fingers of said hand of said user so that said user can monitor a corresponding pulse rate visually through said liquid crystal display and audibly through said speaker;

temporarily storing video and audio data captured by said multimedia device on a primary memory means;

controlling reading and writing of desired digital video and audio data from said primary memory means to an intermediate storage medium;

forming a packet by writing said desired video and audio data to said intermediate storage medium;

repeating said reading and writing of said desired digital video and audio data from said primary memory means thereby forming a sequential array of packets on said intermediate storage medium wherein said array contains at least one packet;

controlling the reading and writing of corresponding biofeedback signals of said user to an intermediate storage medium;

providing a playback signal that includes said recorded biofeedback signals which temporally correspond to video and audio data so that said recorded biofeedback signal is present during playback of said array of packets;

providing a concave depression of said base unit adapted to receive said bottom portion of said multimedia device wherein said concave depression having an USB rectangular projection adapted to be inserted into the USB slot of said multimedia recording device so that recorded data is transmitted efficiently between said multimedia recording device and said base unit when said multimedia recording device is placed in said base unit by said user;

providing a pair of electrical recharge contacts of said concave depression adapted to be in electrical communication with said battery contacts of said multimedia recording device so that said battery is recharged when said multimedia recording device is placed in said base unit by said user; and;

providing a projection lens disposed on said base unit so that video data received from said multimedia device is projected for viewing by said user.

13. The method of claim 12, temporarily storing temporally corresponding biofeedback data of a user on said primary memory means.

14. The method of claim 12, providing a rewritable primary storage medium for the reading and recording of said array of packets.

15. The method of claim 12, recording said array of packets on a primary storage medium within said base unit.

* * * * *